United States Patent Office 2,733,254
Patented Jan. 31, 1956

2,733,254

METHOD OF PRODUCING ORGANIC ISOCYANATES

Tull C. Allen, Oxford, and David H. Chadwick, Anniston, Ala., assignors to Monsanto Chemical Company, St. Louis, Mo., a corporation of Delaware No Drawing. Application March 2, 1953,
Serial No. 339,908

17 Claims. (Cl. 260—453)

This invention relates to an improved method of producing alkyl-, cycloalkyl-, alkaryl-, aralkyl-, aryl- and hydroaryl mono- and polyisocyanates.

Heretofore, alkyl-, cycloalkyl-, alkaryl-, aralkyl- and hydroaryl mono- and polyisocyanates have been prepared by reacting phosgene with the corresponding primary amines in the presence of an inert organic solvent to form an intermediate reaction product which is treated with additional quantities of phosgene to form the corresponding isocyanate. The crude product thus obtained is treated with an inert gas such as nitrogen, methane, natural gas, etc. to remove unreacted phosgene and hydrogen chloride, whereupon the degassed product is distilled to separate the solvent from the isocyanate.

As a modification of the above method, mono- and polyisocyanates have been prepared by first forming the primary amine dihydrochloride salt, slurrying the salt in an inert organic solvent and treating the slurry with phosgene to convert it into a crude solution of the corresponding isocyanate. This solution is then treated in the manner indicated in the preceding paragraph to degas same and separate the solvent from the isocyanate product.

These methods have enjoyed substantial commercial success, but they are subject to the disadvantage of producing an excessive amount of polymers and other undesirable by-products which substantially reduce the yield of the desired isocyanate. Moreover, these methods are subject to a further drawback in that the reaction proceeds at a very slow rate and requires excessive amounts of phosgene and/or relatively high temperatures in order to obtain optimum conversions.

It is an object of the instant invention to overcome the above disadvantages and to provide a new method which permits the production of organic isocyanates in an economically and commercially feasible manner. Other objects and advantages will appear as the description of the invention proceeds.

In accordance with the present invention, a carbonyl halide selected from the group consisting of phosgene and carbonyl bromide is reacted with a primary amine in the presence of an inert organic solvent and a small amount of boron trifluoride or a boron trifluoride complex which liberates boron trifluoride under the reactive conditions of the method. This reaction initially results in the production of an intermediate reaction product containing the corresponding amine hydrohalide, which is treated with additional quantities of phosgene to convert same into a solution of the corresponding isocyanate. As an alternative to the two-step method, there may be employed the single step method of directly producing the isocyanate by reacting the corresponding primary amine hydrohalide with phosgene in the presence of the inert organic solvent and the boron trifluoride catalyst. In either case, the resulting crude solution of isocyanate, with or without a degassing treatment to remove hydrogen halide and unreacted phosgene, may be subjected to fractional distillation to separate substantially pure isocyanate as a distillate.

Broadly stated, the present invention comprises reacting a carbonyl halide selected from the group consisting of phosgene and carbonyl bromide with a primary amine or a hydrohalide of a primary amine selected from the class consisting of alkyl-, cycloalkyl-, alkaryl-, aralkyl-, aryl- and hydroaryl amines, the reaction being carried out in the presence of an inert organic solvent and a boron trifluoride catalyst. The primary amine hydrohalide used in this reaction may be produced by reacting the corresponding amine with a compound selected from the class consisting of carbonyl halides, preferably phosgene, and a hydrogen halide.

More specifically, the instant invention comprises the foregoing methods of producing organic isocyanates, which includes the additional steps of degassing and/or fractionally distilling the resulting solution to recover the isocyanate in a substantially pure form.

The invention is illustrated but not limited by the following examples, in which the parts are expressed by weight.

EXAMPLE I

*p,p'-Diisocyanatodiphenylmethane*

A phosgene solution was prepared by dissolving 200 parts of phosgene in about 862 parts of toluene and to this solution there was added about 8.2 parts of boron trifluoride in the form of a complex with ethyl ether. To the resulting product was added a solution of 200 parts of p,p'-diaminodiphenylmethane in about 862 parts of toluene to form an intermediate reaction product comprising a slurry of p,p'-diaminodiphenylmethane dihydrochloride. This addition took place in a period of about ½ hour, during which time the reaction temperature was not allowed to exceed 40° C. At the completion of this operation, the intermediate reaction product was reacted with about 200 parts of phosgene, the reaction taking place at a temperature within the range of about 40° C. to about 92° C., and within a period of about 2 hours.

The crude reaction product was treated with natural gas to remove hydrogen chloride and unreacted phosgene, whereupon the residue was subjected to distillation to remove the toluene. This resulted in the production of p,p'-diisocyanatodiphenylmethane of about 93% purity and in a yield corresponding to about 90% of theory, basis p,p'-diaminodiphenylmethane.

EXAMPLE II

*p,p'-Diisocyanatodiphenylmethane*

A phosgene solution was prepared by dissolving 108 parts of phosgene in about 431 parts of toluene. To this solution was added a solution of 100 parts of p,p'-diaminodiphenylmethane in about 431 parts of toluene to form an intermediate reaction product comprising a slurry of p,p'-diaminodiphenylmethane dihydrochloride. During this addition, the reaction temperature was maintained below about 50° C. At the completion of this operation, the intermediate reaction product was reacted with about 240 parts of phosgene, the reaction taking place at a temperature within the range of about 65° C. to about 110° C. and within a period of about 3¼ hours. The crude reaction product was treated with natural gas for about 1 hour at 110° C. to remove hydrogen chloride and unreacted phosgene, whereupon the residue was filtered to remove unreacted solid material and then subjected to distillation to remove the toluene. This resulted in the production of crude p,p'-diisocyanatodiphenylmethane in a yield corresponding to about 76% of theory, basis p,p'-diaminodiphenylmethane.

The specific examples clearly indicate that the following highly advantageous results are obtained by using a boron trifluoride catalyst:

(1) The phosgenation reaction can be carried out at a lower temperature.

(2) The phosgenation reaction can be executed at a substantially increased rate.

(3) The phosgenation reaction produces substantially improved yields of the desired isocyanate.

(4) The phosgenation reaction can be carried substantially to completion with smaller amounts of phosgene.

In the production of organic isocyanates in accordance with the instant invention, a carbonyl halide selected from the group consisting of phosgene and carbonyl bromide is reacted with a primary amine in the presence of an inert organic solvent and a boron trifluoride catalyst to form an intermediate reaction product containing the corresponding hydrohalide. This reaction is effected at a temperature substantially in the range of about −20° C. to about 60° C. and within these limits a temperature of about 30° C. to about 50° C. is preferred.

The intermediate reaction product obtained in the foregoing manner is then reacted with additional quantities of carbonyl halide in order to convert it into the corresponding isocyanate. This reaction is carried out at a temperature in the range of about 50° C. up to that temperature at which the most tightly bound boron trifluoride complex in the reaction system decomposes substantially completely into boron trifluoride. More specifically, this reaction is effected at a temperature substantially in the range of about 60° C. to about 200° C. and within this range a temperature of about 70° C. to about 120° C. is preferred.

In executing the foregoing reactions, the reactants are reacted together in the proportions providing an overall carbonyl halide/amine molecular ratio of about 1.2 to about 3.5. This means that if in the primary reaction a molar ratio of less than 1 is used, sufficient carbonyl halide is added in the secondary reaction to bring the final carbonyl halide/amine molar ratio up to a value within the above range. Slightly larger or smaller overall carbonyl halide/amine molar ratios are also within the scope of the invention, but when smaller ratios are employed, the theoretical requirements at least should be substantially met.

The reaction of the carbonyl halide with the slurry or solution of primary amine hydrohalide in the presence of an inert organic solvent and a boron trifluoride catalyst is executed at a temperature substantially in the range of about 50° C. up to that temperature at which the most tightly bound boron trifluoride complex in the reaction system decomposes substantially completely into boron trifluoride. More specifically, the reaction is carried out at a temperature substantially in the range of about 60° C. to about 200° C. and within these limits a temperature of about 70° C. to about 120° C. is preferred. In this reaction, the reactants are employed in a carbonyl halide/amine hydrohalide molar ratio of about 1.2 to about 3.5. Larger or smaller ratios are also within the scope of the invention, but when using smaller ratios the theoretical requirements should be substantially met.

The molar ratios hereinbefore set forth are applicable to the production of monoisocyanates from primary monoamines and it should be clearly understood that the amount of carbonyl halide employed is increased as the number of amino groups in the primary amine increases. For example, whereas a carbonyl halide/amine hydrohalide molar ratio of about 1.2 is employed in making an organic monoisocyanate, this ratio is increased to 2.2 and 3.2 when preparing organic diisocyanates and triisocyanates, respectively.

Stated broadly, the boron trifluoride is employed in an amount sufficient to substantially increase the rate of reaction over that obtainable without this catalyst. The amount of catalyst required to achieve this objection varies with the reactants, but, in general, the reaction rate is substantially increased by employing about 0.5% to about 3% by weight of the catalyst, basis the amine. However, the use of smaller or larger amounts of catalyst is also within the scope of the invention.

The boron trifluoride catalyst may be mixed with either one or both of the reactants, solutions or slurries of the reactants, or the inert organic solvent followed by the successive or simultaneous addition of the amine or amine hydrohalide and carbonyl halide. Of these methods, it is preferred to add the boron trifluoride to the amine solution or amine hydrohalide slurry and then react the latter with the carbonyl halide. The boron trifluoride may be added as such or as a complex with a compound other than the reactants, which does not contain an active hydrogen atom. Illustrative examples of such compounds are ethers such as diethyl ether, acetone, pyridine, dimethylaniline, ethyl acetate and anisole.

The reaction medium used in the practice of the instant invention is an inert organic solvent for the amine and the isocyanate product, which boils at atmospheric pressure at a temperature not exceeding 200° C., and preferably not exceeding 150° C. Typical examples of these are benzene, monchlorobenzene, dichlorobenzene, toluene, xylene, cyclohexane, carbon tetrachloride, tetrachloroethylene, trichloroethylene, tetrachloroethane, amylbenzene and cymenes.

The degassing operation hereinbefore mentioned is desirable for the purpose of eliminating unreacted carbonyl halide and by-product hydrogen halide, but this step is optional and may be omitted, if desired.

What we claim is:

1. The method of producing organic isocyanates, which comprises reacting a carbonyl halide selected from the group consisting of phosgene and carbonyl bromide with a hydrohalide of a primary amine selected from the class consisting of alkyl-, cycloalkyl-, alkaryl-, aralkyl-, aryl- and hydroaryl amines, said reaction being carried out in the presence of an inert organic solvent, a sufficient amount of a boron trifluoride catalyst to substantially increase the rate of reaction over that obtainable without the use of said catalyst and at a temperature substantially in the range of from about 50° C. up to that temperature at which the most tightly bound boron trifluoride complex substantially completely liberates its boron trifluoride content, and said reactants being employed in at least the molar ratio stoichiometrically required to substantially completely convert each amine hydrohalide group of said primary amine hydrohalide into isocyanate groups.

2. The method of producing organic isocyanates in accordance with claim 1, wherein the primary amine hydrohalide is produced by reacting the corresponding amine with a compound selected from the group consisting of phosgene, carbonyl bromide and hydrogen halide.

3. The method of producing organic isocyanates in accordance with claim 2, which includes the additional step of degassing the resulting solution of organic isocyanate.

4. The method of producing organic isocyanates in accordance with claim 3, which includes the additional step of recovering the organic isocyanate from the resulting solution of said product.

5. The method of producing organic isocyanates, which comprises reacting phosgene with a hydrochloride of a primary amine selected from the class consisting of alkyl-, cycloalkyl-, alkaryl-, aralkyl-, aryl- and hydroaryl amines, said reaction being carried out in the presence of an inert organic solvent, a sufficient amount of a boron trifluoride catalyst to substantially increase the rate of reaction over that obtainable without the use of said catalyst and at a temperature substantially in the range of about 60° C. to about 200° C., and said reactants being employed in at least the molar ratio stoichiometrically required to substantially completely convert each amine hydrochloride group of said primary amine hydrochloride into isocyanate groups.

6. The method of producing organic isocyanates in accordance with claim 5, wherein an inert organic solvent is employed which boils at a temperature not exceeding 200° C. and preferably not exceeding 150° C.

7. The method of producing organic isocyanates, which comprises reacting phosgene with a hydrochloride of a primary amine selected from the class consisting of alkyl-, cycloalkyl-, alkaryl-, aralkyl-, aryl- and hydroaryl amines, said reaction being carried out in the presence of an inert organic solvent, a sufficient amount of a boron trifluoride catalyst to substantially increase the rate of reaction over that obtainable without the use of said catalyst and at a temperature of about 70° C. to about 120° C., and said reactants being employed in a molar ratio providing phosgene in an amount corresponding to a 20% to 250% molar excess of that stoichiometrically required to substantially completely convert each amine hydrochloride group of said primary amine hydrochloride into an isocyanate group.

8. The method of producing organic isocyanates in accordance with claim 7, wherein the boron trifluoride catalyst is employed in an amount supplying about .5% to about 3% by weight of boron trifluoride, basis said primary amine.

9. The method of producing organic isocyanates in accordance with claim 8, wherein the boron trifluoride is supplied to the reaction in the form of a complex with a material other than the reactants.

10. The method of producing organic diisocyanates, which comprises reacting phosgene with a dihydrochloride of a primary diamine selected from the class consisting of alkyl-, cycloalkyl-, alkaryl-, aralkyl-, aryl- and hydroaryl diamines, said reaction being carried out in the presence of an inert organic solvent, a sufficient amount of boron trifluoride catalyst to substantially increase the rate of reaction over that obtainable without the use of said catalyst and at a temperature of about 60° C. to about 200° C., and said reactants being employed in a phosgene/primary diamine dihydrochloride molar ratio providing phosgene in an amount corresponding to a 20% to about 250% molar excess of that stoichiometrically required to convert each amine hydrochloride group of said primary diamine dihydrochloride into isocyanate groups.

11. The method of producing organic diisocyanates in accordance with claim 10, wherein p,p'-diaminodiphenylmethane dihydrochloride is the primary diamine dihydrochloride employed.

12. The method of producing organic diisocyanates in accordance with claim 11, wherein the boron trifluoride catalyst is employed in an amount supplying about 1.86% by weight of boron trifluoride, basis p,p'-diaminodiphenylmethane.

13. The method of producing organic diisocyanates in accordance with claim 10, wherein m-tolylene diamine dihydrochloride is the primary diamine dihydrochloride employed.

14. The method of producing organic diisocyanates in accordance with claim 13, wherein the boron trifluoride catalyst is employed in an amount supplying about 1.86% by weight of boron trifluoride, basis m-tolylene diamine.

15. The method of producing organic diisocyanates, which comprises reacting together at a temperature substantially in the range of about minus 20° C. to about 60° C. phosgene and a primary diamine selected from the class consisting of alkyl-, cycloalkyl-, alkaryl-, aralkyl-, aryl- and hydroaryl diamines to form an intermediate reaction product containing the corresponding diamine dihydrochloride and then reacting said intermediate reaction product at a temperature substantially in the range of about 60° C. to about 200° C. with phosgene to convert it into the corresponding diisocyanate, said reactions being carried out in the presence of an inert organic solvent and a boron trifluoride catalyst in an amount supplying about 0.5% to about 3% by weight of boron trifluoride, basis said primary diamine, and said reactants being employed in at least the molar ratios stoichiometrically required to substantially completely convert the amino groups of said primary diamine into isocyanate groups.

16. The method of producing organic diisocyanates in accordance with claim 15, which includes the additional step of degassing the resulting solution of organic diisocyanate.

17. The method of producing organic diisocyanates in accordance with claim 16, which includes the additional step of recovering the organic diisocyanate from the resulting solution of said product.

References Cited in the file of this patent
UNITED STATES PATENTS

| | | |
|---|---|---|
| 2,362,648 | Lichty et al. | Nov. 14, 1944 |
| 2,564,640 | D'Ianni | Aug. 14, 1951 |